(12) United States Patent
Maxwell

(10) Patent No.: US 7,251,754 B2
(45) Date of Patent: Jul. 31, 2007

(54) FAULT MANAGEMENT SYSTEM FOR A COMMUNICATIONS NETWORK

(75) Inventor: Richard Maxwell, Colchester (GB)

(73) Assignee: British Telecommunications public limited company, London (GB)

( * ) Notice: Subject to any disclaimer, the term of this patent is extended or adjusted under 35 U.S.C. 154(b) by 563 days.

(21) Appl. No.: 10/433,657

(22) PCT Filed: Dec. 17, 2001

(86) PCT No.: PCT/GB01/05555

§ 371 (c)(1),
(2), (4) Date: Jun. 6, 2003

(87) PCT Pub. No.: WO02/052821

PCT Pub. Date: Jul. 4, 2002

(65) Prior Publication Data

US 2004/0039958 A1    Feb. 26, 2004

(30) Foreign Application Priority Data

Dec. 22, 2000 (GB) .................................. 0031534.1

(51) Int. Cl.
*G06F 11/00* (2006.01)
(52) U.S. Cl. ......................................... 714/43; 714/47
(58) Field of Classification Search ................. 714/43;
370/250; 702/181, 184; 379/29.11, 26.02, 379/14.01, 16, 28, 26.01
See application file for complete search history.

(56) References Cited

U.S. PATENT DOCUMENTS

| | | | |
|---|---|---|---|
| 3,652,798 A | * | 3/1972 | McNeilly et al. ........... 370/224 |
| 4,581,493 A | | 4/1986 | Gazzo et al. |
| 5,392,328 A | * | 2/1995 | Schmidt et al. .......... 379/27.06 |
| 5,790,634 A | | 8/1998 | Kinser, Jr. et al. |
| 6,038,288 A | * | 3/2000 | Thomas et al. .......... 379/15.01 |
| 6,128,753 A | * | 10/2000 | Keeble et al. ................. 714/25 |
| 6,308,174 B1 | * | 10/2001 | Hayball et al. ............... 707/10 |

(Continued)

OTHER PUBLICATIONS

Trigger et al., "New Technology for Reducing Operational Costs", BT Technology Journal, BT Laboratories, GB, vol. 16, No. 5, Oct. 1, 1998, pp. 152-164.*

(Continued)

*Primary Examiner*—Scott Baderman
*Assistant Examiner*—Paul F. Contino
(74) *Attorney, Agent, or Firm*—Nixon & Vanderhye P.C.

(57) ABSTRACT

A fault management system is directed to the access network part of a communications network where terminating lines in the form of pairs of copper wires extend from a local switch through a series of nodes to terminal equipment provided for user of the network. Each night, a test head performs a series of tests on each of the terminating lines. The results of the tests are transmitted to an access network management system where they are analyzed with respect to a set of parameters to identify characteristics that would indicate that a fault is likely to occur on the associated circuit within a predetermined period e.g. 1 year. Further analysis can then be carried out to establish the probability of the fault actually occurring and/or whether the potential fault analyzed is going to occur in either the underground or the over-ground part of the network. Further analysis determines relative costs of repair for circuits or network elements in which faults or potential faults have been identified.

12 Claims, 19 Drawing Sheets

U.S. PATENT DOCUMENTS

| | | | |
|---|---|---|---|
| 6,321,187 B1* | 11/2001 | Squier et al. | 703/18 |
| 6,349,268 B1* | 2/2002 | Ketonen et al. | 702/130 |
| 6,396,904 B1* | 5/2002 | Lilley et al. | 379/9.04 |
| 6,424,930 B1* | 7/2002 | Wood | 702/184 |
| 6,490,543 B1* | 12/2002 | Jaw | 702/184 |
| 6,578,001 B1* | 6/2003 | Schramek | 705/1 |
| 6,615,367 B1* | 9/2003 | Unkle et al. | 714/26 |
| 2003/0055604 A1* | 3/2003 | Skidmore et al. | 702/186 |
| 2003/0149919 A1* | 8/2003 | Greenwald et al. | 714/43 |
| 2004/0059694 A1* | 3/2004 | Darken et al. | 706/21 |
| 2004/0078717 A1* | 4/2004 | Allred et al. | 714/43 |
| 2005/0034029 A1* | 2/2005 | Ramberg et al. | 714/43 |
| 2005/0265321 A1* | 12/2005 | Rappaport et al. | 370/352 |

OTHER PUBLICATIONS

Pahwa, Anil, Flexible Control of Distribution Systems, Sep. 5, 1997, Retrieved from the Internet [May, 12, 2006] <URL: http://www.eece.ksu.edu/~pahwa/890/project1.html>.*

Shultis, J. Kenneth. A User's Guide for PC-ADAM Version 1.02. File USERS.MAN [online]. Kansas Electric Utilities Research Program, 1991 [retrieved on Oct. 23, 2006]. Retrieved from the Internet: <URL: http://www.eece.ksu.edu/~pahwa/890/pcadam.zip>. pp. 1, 2, and 10-19.*

Pahwa, Anil. Fault Location Project User's Manual. File USERS.PS [online]. Department of Electrical and Computer Engineering, 1996 [retrieved on Oct. 23, 2006]. Retrieved from the Internet: <URL: http://www.eece.ksu.edu/~pahwa/890/users.ps>.*

* cited by examiner

Sample of Suspect Data for a DP

| nO. | Cap A_E | Cap A_B | Cap A_B Prev | Cap B_E | Dist | AB_Res | ABt_Res | AE_Res | BA_Res | BBT_Res | BE_Res | Term |
|---|---|---|---|---|---|---|---|---|---|---|---|---|
| Line No. 1 | 84 | 16 | 32 | 85 | 1400 | >1M ohm | >1M ohm | >1M ohm | >1M ohm | >1M ohm | >1M ohm | Bridge |
| Line No. 2 | 89 | 193 | 188 | 86 | 1432 | 22700 | 350200 | 350100 | 10100 | 390656 | 361656 | Bridge |
| Line No. 3 | 81 | 31 | 29 | 86 | 1348 | >1M ohm | >1M ohm | >1M ohm | >1M ohm | 42528 | >1M ohm | Bridge |
| Line No. 4 | 68 | 44 | 36 | 124 | 1132 | >1M ohm | >1M ohm | >1M ohm | >1M ohm | 392704 | 659456 | Bridge |
| Line No. 5 | 86 | 40 | 39 | 92 | 1432 | 247808 | >1M ohm | >1M ohm | >1M ohm | 390656 | >1M ohm | NoTerm |
| Line No. 6 | 88 | 622 | 666 | 83 | 1382 | >1M ohm | >1M ohm | >1M ohm | >1M ohm | >1M ohm | >1M ohm | NoTerm |
| Line No. 7 | 80 | 30 | 30 | 81 | 1334 | >1M ohm | >1M ohm | >1M ohm | >1M ohm | >1M ohm | >1M ohm | No Term |
| Line No. 8 | 89 | 700 | 694 | 83 | 1382 | >1M ohm | >1M ohm | >1M ohm | >1M ohm | >1M ohm | >1M ohm | No Term |
| Line No. 9 | 84 | 29 | 29 | 84 | 1400 | >1M ohm | >1M ohm | >1M ohm | >1M ohm | >1M ohm | >1M ohm | No Term |

Figure 5

Parameters Settings

| CODE | Threshold Parameter Settings | Field Characters | Unit | Type | Default Settings | Range |
|---|---|---|---|---|---|---|
| VD1 | A-B Capacitance drop | 3 | % | Integer | 15 | 0 - 999 |
| VD2 | A - B Capacitance | 5 | $10^{-9}$ Farads | Integer | 100 | 0 - 9,999 |
| VD3 | Resistance A-Earth | 7 | Ohms | Integer | 700,000 | 0 - 9,999,999 |
| VD4 | Resistance B-Earth | 7 | Ohms | Integer | 700,000 | 0 - 9,999,999 |
| VD5 | Resistance A-Battery | 7 | Ohms | Integer | 700,000 | 0 - 9,999,999 |
| VD6 | Resistance B-Battery | 7 | Ohms | Integer | 700,000 | 0 - 9,999,999 |
| VD7 | Resistance A-B | 7 | Ohms | Integer | 700,000 | 0 - 9,999,999 |
| VD8 | Resistance B-A | 7 | Ohms | Integer | 700,000 | 0 - 9,999,999 |
| VD9 | Capacitance Balance | 3 | % | Integer | 20 | 0 - 999 |
| VD10 | Capacitance A,B - Erth | 5 | $10^{-9}$ Farads | Integer | 50 | 0 - 9,999 |

Parameter Settings

| CODE | Threshold Parameter Settings | Field Characters | Unit | Type | Default Settings | Range |
|---|---|---|---|---|---|---|
| TR1 | B - A Leg (Upper) | 7 | Ohms | Integer | 30,000 | 0 - 9,999,999 |
| TR2 | B - A Leg (Lower) | 7 | Ohms | Integer | 10 | 0 - 9,999,999 |
| TR3 | B - A (Upper Centre) | 7 | Ohms | Integer | 5000 | 0 - 9,999,999 |
| TR4 | B - A (Lower Centre) | 7 | Ohms | Integer | 700 | 0 - 9,999,999 |
| TR5 | A - B Multiplier | 5 | No. | Float | 2.00 | 0.00 - 999.9 |
| TR7 | Resistance A - Battery | 7 | Ohms | Integer | 400,000 | 0 - 9,999,999 |
| TR8 | Resistance B - Battery | 7 | Ohms | Integer | 400,000 | 0 - 9,999,999 |
| TR9 | Resistance A - Earth | 7 | Ohms | Integer | 400,000 | 0 - 9,999,999 |
| TR10 | Resistance B - Earth | 7 | Ohms | Integer | 400,000 | 0 - 9,999,999 |

Figure 8

| n | Read Parameters | Test Read (N) | Threshold.1 | Thres_hold.2 | Unit | Actual | Anticpated |
|---|---|---|---|---|---|---|---|
| AHF 1 | Resistance A - B | Resistance A - B | 7000 | 100,000 | Ohm | 22700 | Yes |
| AHF 2 | Resistance B - A | Resistance B - A | 7000 | 100,000 | Ohms | 10100 | Yes |
| AHF 3 | Resistance A - Battery | Resistance A - Battery | 500 | 100,000 | Ohms | 350200 | No |
| AHF 4 | Resistance B - Battery | Resistance B - Battery | 500 | 100,000 | Ohms | 390656 | No |
| AHF 5 | Resistance A - Earth | Resistance A - Earth | 500 | 100,000 | Ohms | 350100 | No |
| AHF 6 | Resistance B - Earth | Resistance B - Earth | 500 | 100,000 | Ohms | 361656 | No |
| AHF 7 | DC Volts A - Earth Neg | DC Volts A - Earth | -50 | -30 | Volts | +48 | No |
| AHF 8 | DC Volts A - Earth Pos | DC Volts A - Earth | +5 | +50 | Volts | +48 | Yes |
| AHF 9 | DC Volts B - Earth Neg | DC Volts B - Earth | -50 | -30 | Volts | -48 | Yes |
| AHF10 | DC Volts B - Earth Pos | DC Volts B - Earth | +5 | +50 | Volts | -48 | No |
| AHF11 | DC Volts A - B Neg | DC Volts A - B | -50 | -30 | Volts | 10 | No |
| AHF12 | DC Volts A - B Pos | DC Volts A - B | +5 | +50 | Volts | 10 | Yes |
| AHF13 | Capacitance A - Earth | Capacitance A - Earth | 0 | 20 | $10^{-9}$ Farads | 89 | No |
| AHF14 | Capacitance B - Earth | Capacitance B - Earth | 0 | 20 | $10^{-9}$ Farads | 86 | No |
| AHF15 | Capacitance A - B | Capacitance A - B | 0 | 20 | $10^{-9}$ Farads | 193 | No |
| AHF16 | Capacitance Balance | Capacitance Balance | 20 | 100 | Percentage | (89-86)/86 3% | No |
| AHF17 | AC Volts A - Earth | AC Volts A - Earth | 0 | 0 | Volts | 5 | No |
| AHF18 | AC Volts B - Earth | AC Volts B - Earth | 0 | 0 | Volts | 6 | No |
| AHF19 | AC Volts A - B | AC Volts A - B | 0 | 0 | Volts | 6 | No |

AHF20 AHF Threshold Param     2     No.

The number of Yes values is 5 > 2 the Threshold parameter this can be classified as an Anticipated Hard Fault.

Figure 9

| CODE n | L Lower Limit | U Upper Limit | UG Weight | OH Weight | Actual | Type L<U A / L>U B | Calculations | Prob |
|---|---|---|---|---|---|---|---|---|
| PB1 | 7000 | 1,000,000 | 0 | 15 | 22700 | A | min(1,(1,000,000-22700)/(1,000,000-7,000)) =min(1,0.98) | 0.98 |
| PB | 7000 | 1,000,000 | 0 | 15 | 10100 | A | min(1,(1,000,000-10700)/(1,000,000-7,000)) =min(1,0.99) | 0.99 |
| PB3 | 500 | 1,000,000 | 30 | 0 | 350200 | A | min(1,(1,000,000-350200)/(1,000,000-7,000)) =min(1,0.65) | 0.65 |
| PB4 | 500 | 1,000,000 | 30 | 0 | 390656 | A | min(1,(1,000,000-390656)/(1,000,000-7,000)) =min(1,0.60) | 0.60 |
| PB5 | 500 | 1,000,000 | 0 | 15 | 350100 | A | min(1,(1,000,000-350100)/(1,000,000-7,000)) =min(1,0.65) | 0.65 |
| PB6 | 500 | 1,000,000 | 0 | 15 | 351656 | A | min(1,(1,000,000-351656)/(1,000,000-7,000)) =min(1,0.64) | 0.64 |
| PB7 | -50 | -0 | 0.5 | 0.1 | +48 | A | Out of range | 0.0 |
| PB8 | +50 | +0.1 | 0.5 | 0.1 | +48 | B | min(1,(48 - 0.1)/(50- 0.1)) =min(1,0.96) | 0.96 |
| PB9 | -50 | -0 | 0.5 | 0.1 | -48 | A | min(1,(0 - (-48))/(0- (-50))) =min(1,0.96) | 0.96 |
| PB10 | +50 | +0.1 | 0.5 | 0.1 | -48 | B | Out of Range | 0.0 |
| PB11 | -50 | -0 | 0.5 | 0.1 | +10 | A | Out of Range | 0.0 |
| PB12 | +50 | +0.1 | 0.5 | 0.1 | +10 | B | min(1,(10 - 0.1)/(50- 0.1)) =min(1,0.20) | 0.20 |
| PB13 | 0 | 20 | 0 | 0 | 89 | A | Out of Range | 0.0 |
| PB14 | 0 | 20 | 0 | 0 | 86 | A | Out of Range | 0.0 |
| PB15 | 0 | 20 | 0 | 0 | 193 | A | Out of Range | 0.0 |
| PB16 | 0 | 20 | 0 | 0 | (89-86)/89 =3% | B | min(1,(20 - 3)/(20- 0)) =min(1,0.85) | 0.85 |
| PB17 | 0 | 1 | 0 | 0 | 5 | A | Out of Range | 0.0 |
| PB18 | 0 | 1 | 0 | 0 | 6 | A | Out of Range | 0.0 |
| PB19 | 0 | 1 | 0 | 0 | 6 | A | Out of Range | 0.0 |

Figure 10

| CODE n | L Lower Limit | U Upper Limit | UG Weight | OH Weight | Actual | Type L<U A L>U B | Prob | Prob x UG. Weight | Prob X OH. Weight |
|---|---|---|---|---|---|---|---|---|---|
| PB1 | 7000 | 1,000,000 | 0 | 15 | 22700 | A | 0.98 | 0.0 | 14.76 |
| PB2 | 7000 | 1,000,000 | 0 | 15 | 10100 | A | 0.99 | 0.0 | 14.95 |
| PB3 | 500 | 1,000,000 | 30 | 0 | 350200 | A | 0.65 | 19.50 | 0.0 |
| PB4 | 500 | 1,000,000 | 30 | 0 | 390656 | A | 0.60 | 18.28 | 0.0 |
| PB5 | 500 | 1,000,000 | 0 | 15 | 350100 | A | 0.65 | 0.0 | 9.75 |
| PB6 | 500 | 1,000,000 | 0 | 15 | 351656 | A | 0.64 | 0.0 | 9.73 |
| PB7 | -50 | -0 | 0.5 | 0.1 | +48 | B | 0.0 | 0.0 | 0.0 |
| PB8 | +50 | +0.1 | 0.5 | 0.1 | +48 | A | 0.96 | 0.48 | 0.10 |
| PB9 | -50 | -0 | 0.5 | 0.1 | -48 | B | 0.96 | 0.48 | 0.10 |
| PB10 | +50 | +0.1 | 0.5 | 0.1 | -48 | A | 0.0 | 0.0 | 0.0 |
| PB11 | -50 | -0 | 0.5 | 0.1 | +10 | A | 0.0 | 0.0 | 0.0 |
| PB12 | +50 | +0.1 | 0.5 | 0.1 | +10 | B | 0.20 | 0.10 | 0.02 |
| PB13 | 0 | 20 | 0 | 0 | 89 | A | 0.0 | 0.0 | 0.0 |
| PB14 | 0 | 20 | 0 | 0 | 86 | A | 0.0 | 0.0 | 0.0 |
| PB15 | 0 | 20 | 0 | 0 | 193 | A | 0.0 | 0.0 | 0.0 |
| PB16 | 0 | 20 | 0 | 0 (89-86)/89 =3% | B | 0.85 | 0.0 | 0.0 |
| PB17 | 0 | 1 | 0 | 0 | 5 | A | 0.0 | 0.0 | 0.0 |
| PB18 | 0 | 1 | 0 | 0 | 6 | A | 0.0 | 0.0 | 0.0 |
| PB19 | 0 | 1 | 0 | 0 | 6 | A | 0.0 | 0.0 | 0.0 |
| | | | | | | | Total | 38.85 | 49.39 |

Figure 12

| CODE n | Read Parameters | Test Read(n) | AFS. Weight (n) | Units | Prob | Probx Weight |
|---|---|---|---|---|---|---|
| AFS 1 | Resistance A - B | Resistance A - B | 1 | 0 - 100 | 0.98 | 0.98 |
| AFS 2 | Resistance B - A | Resistance B - A | 1 | 0 - 100 | 0.99 | 0.99 |
| AFS 3 | Resistance A - Battery | Resistance A - Battery | 1 | 0 - 100 | 0.65 | 0.65 |
| AFS 4 | Resistance B - Battery | Resistance B - Battery | 1 | 0 - 100 | 0.60 | 0.60 |
| AFS 5 | Resistance A - Earth | Resistance A - Earth | 1 | 0 - 100 | 0.65 | 0.65 |
| AFS 6 | Resistance B - Earth | Resistance B - Earth | 1 | 0 - 100 | 0.64 | 0.64 |
| AFS 7 | DC Volts A - Earth Neg | DC Volts A - Earth | 0 | 0 - 100 | 0.0 | 0.0 |
| AFS 8 | DC Volts A - Earth Pos | DC Volts A - Earth | 0 | 0 - 100 | 0.96 | 0.0 |
| AFS 9 | DC Volts B - Earth Neg | DC Volts B - Earth | 0 | 0 - 100 | 0.96 | 0.0 |
| AFS10 | DC Volts B - Earth Pos | DC Volts B - Earth | 0 | 0 - 100 | 0.0 | 0.0 |
| AFS11 | DC Volts A - B Neg | DC Volts A - B | 0 | 0 - 100 | 0.0 | 0.0 |
| AFS12 | DC Volts A - B Pos | DC Volts A - B | 0 | 0 - 100 | 0.20 | 0.0 |
| AFS13 | Capacitance A - Earth | Capacitance A - Earth | 0 | 0 - 100 | 0.0 | 0.0 |
| AFS14 | Capacitance B - Earth | Capacitance B - Earth | 0 | 0 - 100 | 0.0 | 0.0 |
| AFS15 | Capacitance A - B | Capacitance A - B | 0 | 0 - 100 | 0.0 | 0.0 |
| AFS16 | Capacitance Balance | Capacitance Balance | 0 | 0 - 100 | 0.0 | 0.0 |
| AFS17 | AC Volts A - Earth | AC Volts A - Earth | 0 | 0 - 100 | 0.0 | 0.0 |
| AFS18 | AC Volts B - Earth | AC Volts B - Earth | 0 | 0 - 100 | 0.0 | 0.0 |
| AFS19 | AC Volts A - B | AC Volts A - B | 0 | 0 - 100 | 0.0 | 0.0 |
|  |  |  |  |  | Total | 4.51 |

Figure 13

$$\text{AFS.Score} = \left\{ \int_{\text{For all tests (AFS1 to AFS19)}} \text{Probability of failure (n)} \times \text{AFS. Weighting(n)} \right\} + \text{AFS20 (IF Hard Fault Circuit)} + \text{AFS21 (IF Anticipated Hard Fault Circuit)}$$

As Line 2 has weighted failure rate                                                         4.51
As Line 2 was defined as a Rectified Loop then this is a Hard Fault Circuit (see slide 6)   AFS20 = 5
As Line 2 was defined as an Anticipated Hard Fault (see slide 7)                            AFS21 = 3
                                                                                            Total  12.51

Tables for AFS Score Calibration to Actual AFS will be user definable and the figures below are provisional settings.

Actual Annual Fault Saving (AFS) is 1 Failure within a Year.

| CODE | No. | Lower | Upper | Actual AFS |
|------|-----|-------|-------|------------|
| SC1  | 1   | 0.0   | 0.1   | 0          |
| SC2  | 2   | 0.1   | 0.5   | 0.2        |
| SC3  | 3   | 0.5   | 1.0   | 0.3        |
| SC4  | 4   | 1.0   | 1.5   | 0.4        |
| SC5  | 5   | 1.5   | 2.0   | 0.5        |
| SC6  | 6   | 2.0   | 2.5   | 0.6        |
| SC7  | 7   | 2.5   | 3.0   | 0.7        |
| SC8  | 8   | 3.0   | 3.5   | 0.8        |
| SC9  | 9   | 3.5   | 4.0   | 0.9        |
| SC10 | 10  | 4.0   | 5.0   | 1.0        |
| SC11 | 11  | 5.0   | 6.0   | 1.0        |
| SC12 | 12  | 6.0   | 26    | 1.0        |

Annual Faults Saving Scoring Curve

Figure 14

Summary of data for a DP.

| | OH | UG | Antic | HF | Combi | Type | AFS |
|---|---|---|---|---|---|---|---|
| Line No. 1 | 0 | 0 | | | 0 | 0 | 0 |
| Line No. 2 | 49.05 | 37.79 | 1 | 1 | 61.92 | OH | 1 |
| Line No. 3 | 0 | 28.74 | | | 28.74 | UG | 0.3 |
| Line No. 4 | 5.11 | 18.23 | | | 18.93 | UG | 0.3 |
| Line No. 5 | 11.36 | 18.29 | | | 21.53 | UG | 0.4 |
| Line No. 6 | 0 | 0 | | | 0 | 0 | 0 |
| Line No. 7 | 0 | 0 | | | 0 | 0 | 0 |
| Line No. 8 | 0 | 0 | | | 0 | 0 | 0 |
| Line No. 9 | 0 | 0 | | | 0 | 0 | 0 |

| Total | 65.52 | 103.05 | | | 131.12 | | |
|---|---|---|---|---|---|---|---|
| | Overhead | | 1 | 1 | | 1 | 1.0 |
| | Underground | | 0 | 0 | | 3 | 1.0 |

Figure 15

Ranking Score for Overhead.

Rank.OH.DP = ROK1 x SMV.DP x (Sum of all OH.Score that are OVERHEAD NETWORK)+
ROK2 x SMV.DP x(Number of Anticipated Hard Faults that are OVERHEAD NETWORK )
+ ROK3 x (Number of Hard Faults that are OVERHEAD NETWORK )
+ ROK4 x SMV.DP x (Number of circuits that are OVERHEAD NETWORK )
- ROK5 x (Number of Line on the DP - (SMV.DP x (Number of circuits that are OVERHEAD NETWORK)))

Assume SMV.DP the smoothing value =1.

Default Settings

| Code | Name Overhead | Value | Unit | Range | Calculations | | |
|------|---------------|-------|------|-------|--------------|---|---|
| ROK1 | Rank1. (Prob. of Failure) | 2 | Integer | 0 - 100 | 2x1x65.52 | = | 131.04 |
| ROK2 | Rank2. (Anticipated H. Flt) | 15 | Integer | 0 - 100 | 15x1x1 | = | 15.0 |
| ROK3 | Rank3. (Hard Faults) | 30 | Integer | 0 - 100 | 30x1 | = | 30.0 |
| ROK4 | Rank4. (No.Circuits) | 5 | Integer | 0 - 100 | 5x1 | = | 5.0 |
| ROK5 | Rank5. (Good Circuits DP's) | 0 | Integer | 0 - 100 | -0x(9-(1x1)) | = | 0.0 |

Total OH Score = 181.04

DP Overhead Ranking Parameters

Figure 16

Ranking for Underground.

Rank.UG.DP = RUK1 x SMV.DP x (Sum of all UG.Scores that are UNDERGROUND NETWORK)
+ RUK2 x SMV.DP x(Number of Anticipated Hard Faults that are UNDERGROUND NETWORK)
+ RUK3 x (Number of Hard Faults that are UNDERGROUND NETWORK)
+ RUK4 x SMV.DP x (Number of circuits that are UNDERGROUND NETWORK)
− RUK5 x (Number of Line on the DP − (SMV.DP x (Number of circuits that are UNDERGROUND NETWORK))).

Assume SMV.DP the smoothing value =1.

DP Underground Ranking Parameters

| Code | Name Overhead | Value | Unit | Range | Calculations | | |
|------|---------------|-------|------|-------|--------------|---|---|
| RUK1 | Rank1. (Prob. of Failure) | 2 | Integer | 0 - 100 | 2x1x103.05 | = | 206.10 |
| RUK2 | Rank2. (Anticipated H. Flt) | 15 | Integer | 0 - 100 | 15x1x0 | = | 0.0 |
| RUK3 | Rank3. (Hard Faults) | 30 | Integer | 0 - 100 | 30x0 | = | 0.0 |
| RUK4 | Rank4. (No.Circuits) | 5 | Integer | 0 - 100 | 5x3 | = | 15.0 |
| RUK5 | Rank5. (Good Circuits DP's) | 2 | Integer | 0 - 100 | −2x(9−(1x3)) | = | −12.0 |

Total UG Score = 209.10

Figure 17

Ranking for Combined Score DP.

Rank.CM.DP =   RCK1 x SMV.DP x (Sum of all DP Circuit Scores)
+ RCK2 x SMV.DP x (Number of Anticipated Hard Fault)
+ RCK3 x (Number of Hard Faults)
+ RCK4 x SMV.DP x(Number of suspect circuits)
- RCK5 x (Number of Line on the DP - (SMV.DP x (Number of suspect circuits))).

Assume SMV.DP the smoothing value =1.

DP Combine Ranking Parameters

| Code | Name Overhead | Value | Unit | Range | Calculations | | |
|---|---|---|---|---|---|---|---|
| RCK1 | Rank1. (Prob. of Failure) | 2 | Integer | 0 - 100 | 2x1x131.12 | = | 206.10 |
| RCK2 | Rank2. (Anticipated H. Flt) | 15 | Integer | 0 - 100 | 15x1x1 | = | 15.0 |
| RCK3 | Rank3. (Hard Faults) | 30 | Integer | 0 - 100 | 30x1 | = | 30.0 |
| RCK4 | Rank4. (No.Circuits) | 5 | Integer | 0 - 100 | 5x1x4 | = | 20.0 |
| RCK5 | Rank5. (Good Circuits DP's) | 2 | Integer | 0 - 100 | -2x(9-(1x4)) | = | -10.0 |

Total Combine Score   =261.10

Figure 18

The Overhead DP AFS    DP.AFS.OH = $f$ AFS Circuits on DP WHEN OVERHEAD NETWORK

The Underground DP AFS   DP.AFS.UG = $f$ AFS Circuits on DP WHEN UNDERGROUND NETWORK The Combined AFS    DP.AFS = DP.AFS.UG + DP.AFS.OH.

| | OH | UG | Antic | HS | Combi | Type | AFS |
|---|---|---|---|---|---|---|---|
| Total | 65.52 | 103.05 | | | 131.12 | | |
| | | Overhead | 1 | 1 | 1 | 1 | 1.0 |
| | | Underground | 0 | 0 | 0 | 3 | 1.0 |

In the case of DP   Overhead DP AFS = 1, Underground DP AFS = 1,   Total   Combined AFS for DP = 2.0

FAULT MANAGEMENT SYSTEM FOR A COMMUNICATIONS NETWORK

This application is the US national phase of international application PCT/GB01/05555 filed 17 Dec. 2001 which designated the U.S.

BACKGROUND

1. Technical Field

This invention relates to a fault management system for managing faults in the terminating circuits of a communications network and also to a method of operating such a fault management system.

2. Related Art

A conventional communications network comprises a relatively small number of interconnected main switches and a much larger number of local switches, each of which is connected to one or two main switches. The local switches are connected to the terminating circuits of the network and the far ends of these circuits are connected to terminal equipment such as telephone instruments provided for users of the network. The network formed from the main switches and local switches is known as the core network while a network formed from the terminating circuits is known variously as an access network or a local loop. In this specification, it will be referred to as an access network. Some terminating circuits are connected to a remote concentrator, which may or may not have switching capability. The remote concentrator is then connected to a local switch. In this specification, the term "local switch" is to be interpreted to cover both local switches and remote concentrators.

In a conventional access network, each terminating circuit is formed from a pair of copper wires. Typically, each pair of copper wires passes through a series of nodes (or network elements) between the local switch and terminal equipment. Examples of such nodes are primary cross-connect points, secondary cross-connect points, distribution points (DPs), cable nodes and joints.

Recently, optical fibres have been used to carry terminating circuits in access networks. In a modern access network, both pairs of copper wires and optical fibres are used to carry the terminating circuits. Where a terminating circuit is carried by an optical fibre, the circuit will typically pass through several node between the local switch and the terminal equipment. At each node, the incoming fibre from the local switch is split into a group of outgoing fibres which branch out in various directions. Where a terminating circuit is carried by an optical fibre from the local switch, the last part of the circuit may be carried by a pair of copper wires. Unfortunately, terminating circuits are prone to faults. In the case of a terminating circuit carried by a pair of copper wires, examples of such faults are disconnection, a short circuit between two wires of a pair of wires and a short circuit between one of the wires and earth. In the case of a conventional access network formed from pairs of wires, the causes of the faults include ingress of water into a node and also physical damage to a node.

When a customer reports a fault, the terminating circuit may be tested so as to identify the cause of the fault. The fault can then be repaired. However, until the fault is repaired, the user suffers a loss of service.

It is known how to perform a set of circuit tests on each terminating circuit in an access network on a routine basis, for example nightly. Such routine tests can detect a fault on a terminating circuit. The fault can then be repaired, possibly before the user of the terminating circuit notices a loss of service. It is also known to measure the operational quality of individual nodes of an access network. Where the operational quality of a node is poor, it is likely that faults will develop in terminating circuits passing through the node. However, although it is possible to measure the operational quality of a node current systems do not provide information to the network administrator to indicate what resources might be required when or if the fault(s) actually occur in order to repair them.

BRIEF SUMMARY

According to one aspect of the invention, there is provided a method of operating a fault management system for a communications network, said communications network including a switch and an access network of one or more terminating circuits connecting said switch to terminal equipment provided for users of the communications network, the or each of said terminating circuits passing through one or more nodes between said switch and its respective terminal equipment, said method comprising the steps of:

performing a circuit test on the or each circuit of at least a subset of said terminating circuits and to produce a test result for the or each circuit so tested, the or each test result comprising one or more elements of test data;

for the or each circuit identifying whether a fault exists on the circuit;

identifying circuits that have a possibility of becoming faulty within the predetermined period;

associating a repair cost with each fault or potential fault; and for the or each circuit calculating a measure of the possible cost of repair of the circuit over a predetermined period.

By providing an indication of the relative cost of repair of a circuit or network element, the resources that are likely to be required to meet the repair can be put in place. Furthermore, proactive maintenance can be conducted in problem areas to avoid the faults identified. This facility also helps in the planning of maintenance of the network.

According to another aspect of the invention, there is provided a fault management apparatus for a communications network including a switch and an access network of terminating circuits connecting said switch to terminal equipment provided for users of the communications network, each of said terminating circuits passing through a series of nodes between said switch and its respective terminal equipment, said fault management apparatus comprising:

circuit testing apparatus arranged to perform circuit tests on said terminating circuits to produce test results;

a store containing data relating to said terminating circuits;

means for identifying in the or each circuit whether a fault exists on the circuit;

means for identifying circuits that have a possibility of becoming faulty within the predetermined period;

means for associating a repair cost with each fault or potential fault; and means operable, for the or each circuit to calculate a measure of the possible cost of repair of the circuit over a predetermined period.

BRIEF DESCRIPTION OF THE DRAWINGS

This invention will now be described in more detail, by way of example, with reference to the accompanying drawings in which:

FIGS. 5 to 10 are tables of data and parameters and data used in the processing illustrated in FIG. 4;

FIGS. 12 to 18 are tables of data and parameters and data used in the processing illustrated in FIG. 11.

DETAILED DESCRIPTION OF EXEMPLARY EMBODIMENTS

Figure 1:
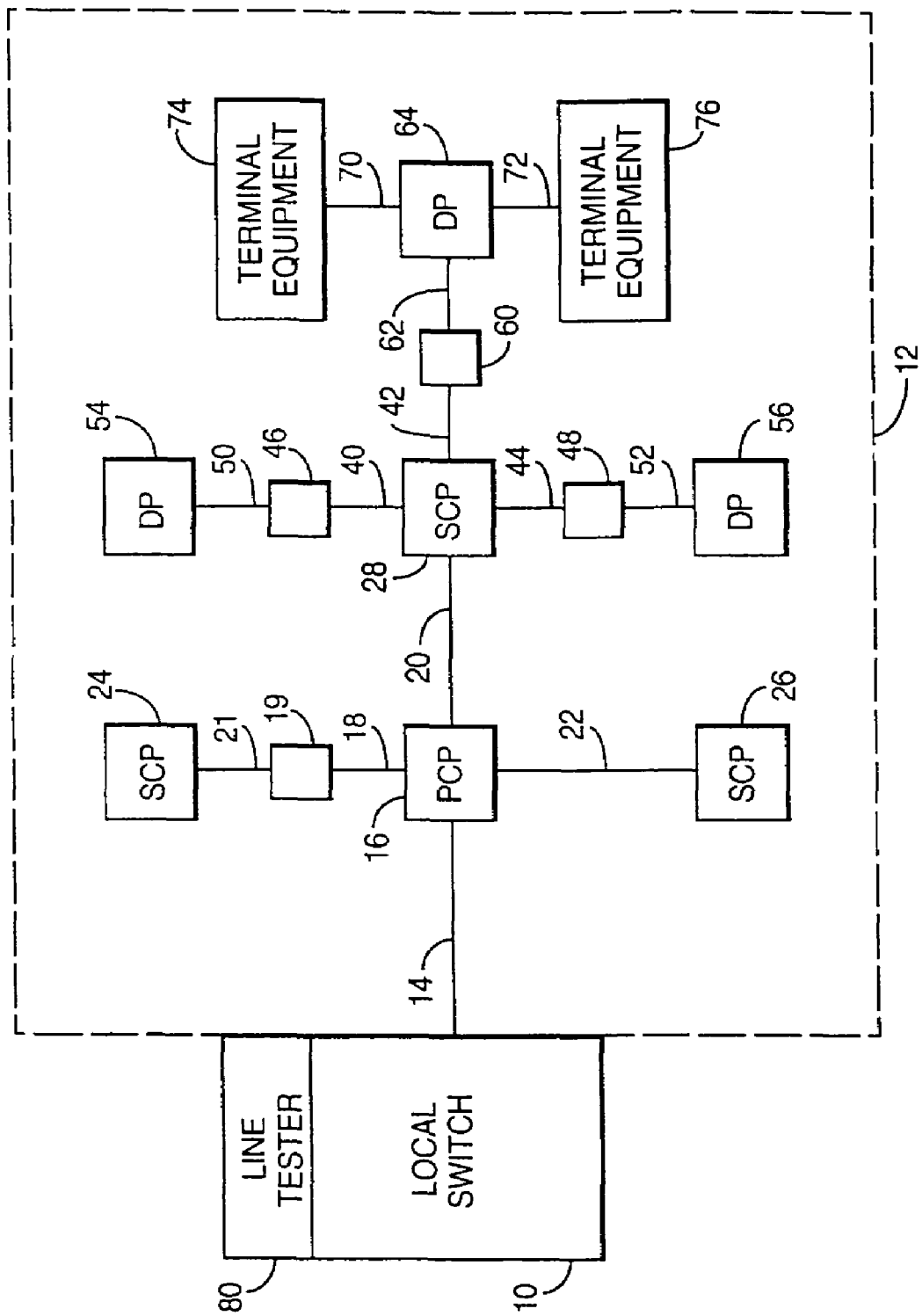
FIG. 1 is a block diagram of an access network and an associated local switch which form part of a communications network in which the present invention may be used.

Referring now to FIG. 1, there is shown a local switch 10 and a conventional access network 12 connected to the local switch 10. The local switch 10 and the access network 12 form part of a communications network. The local switch 10 is connected to the terminating circuits or lines of the access network 12. Typically, a local switch is connected to several thousand terminating circuits. Each terminating circuit or line passes through several nodes before reaching its respective terminal equipment. These nodes comprise primary cross-connect points, secondary cross-connect points, distribution points (DPs) and junctions and examples of these nodes will be described below.

In the conventional access network 12 shown in FIG. 1, each terminating circuit or line is formed from a pair of copper wires. The copper wires leave the local switch 10 in the form of one or more cables. One of these cables is shown in FIG. 1 and indicated by reference numeral 14. The far end of cable 14 from switch 10 is connected to a primary cross-connect point 16 which may be housed in a street cabinet or underground junction box. From the primary cross-connect point 16, the terminating lines branch out as cables in several directions. For simplicity, in FIG. 1 there are shown only three cables 18, 20 and 22. The far end of cable 18 is connected to a joint 19. The joint 19 is connected by cable 21 to a secondary cross-connect point 24. The far ends of cables 20 and 22 are connected, respectively, to secondary cross-connect points 26 and 28. For reasons of simplicity, the continuations of the terminating lines beyond secondary cross-connect points 24 and 26 are not shown. The secondary cross-connect points 24, 26 and 28 are housed in junction boxes which may be located above or below ground.

From the secondary cross-connect point 28, the terminating lines branch out again in several directions in the form of cables. By way of illustration, FIG. 1 shows cables 40, 42, and 44 leaving the secondary cross-connect point 28. Cables 40 and 44 are connected, respectively, to joints 46 and 48. Joints 46 and 48 are connected, respectively, to cables 50 and 52, the far ends of which are connected to distribution points 54 and 56. The far end of cable 42 is connected to a joint 60. The joint 60 is connected by cable 62 to a distribution point 64. For reasons of simplicity, the terminating lines beyond distribution points 54 and 56 are not shown.

Distribution points are implemented as junctions boxes which are typically located on telephone poles. From each distribution point, the terminating lines branch out as single copper wire pairs to where terminal equipment provided for a user of the network is located. By way of illustration, FIG. 1 shows two single copper wire pairs 70, 72, leaving the distribution point 64. The far ends of copper wire pairs 70 and 72 are connected, respectively, to terminal equipment 74, 76. As is well known, terminal equipment may take various forms. For example, terminal equipment may be a telephone located in a telephone box, a telephone instrument located in a domestic house or an office, or a fax machine or a computer located in a customer's premises. In the example shown in FIG. 1, each of the joints 19, 46, 48 and 60 is used to connect two cables together. Joints may also be used to connect two or more smaller cables to a larger cable.

In each terminating line, the two wires of each pair are designated as the A wire and the B wire. At the local switch 10, in order to supply current to the line, a bias voltage of 50V is applied between the A wire and the B wire. As the bias voltage was applied in the early exchanges by using a battery, the bias voltage is still known as the battery voltage. In the terminal equipment, the A wire and B wire are connected by a capacitor, the presence of which may be detected when the terminal equipment is not in use.

The terminating lines in the access network 10 are prone to faults. The main causes of these faults are ingress of water and physical damage to the nodes through which the terminating lines pass between the local switch 10 and terminal equipment. There are five main faults which occur due to causes arising in the nodes. These faults are disconnection, short circuit, faulty battery voltage, earthing fault and low insulation resistance. A disconnection arises where a terminating line is interrupted between the local switch and the terminal equipment. A short circuit arises where the A wire and B wire of a line are connected together. A faulty battery voltage arises where the A wire or the B wire of a terminating line has a short circuit connection to the B wire of another line. An earthing fault arises when the A wire or B wire is connected to earth or the A wire of another line. Low insulation resistance arises where the resistance between the A wire and the B wire or between one of the wires and earth or between one of the wires and a wire of another line is below an acceptable value.

In order to detect faults in the terminating lines of the access network 12, the local switch 10 is provided with a line tester 80. The line tester 80 may be operated from the local switch 10 or, as will be explained in more detail below, from a remote location. The line tester 80 is capable of performing various tests, examples of which will be described below. Various models of line testers for local switches are available commercially. In the present example, the line tester 80 is either Teradyne and Vanderhoff test equipment. In some case both types of test equipments may be used. As well as producing resistance, capacitance and voltage measurement data for line these pieces of equipment also further data called Termination Statements such as "Bell Loop", "Master Jack Loop" and "Bridged". These termination statements are special line conditions which the equipment is arranged to detect.

Figure 2:
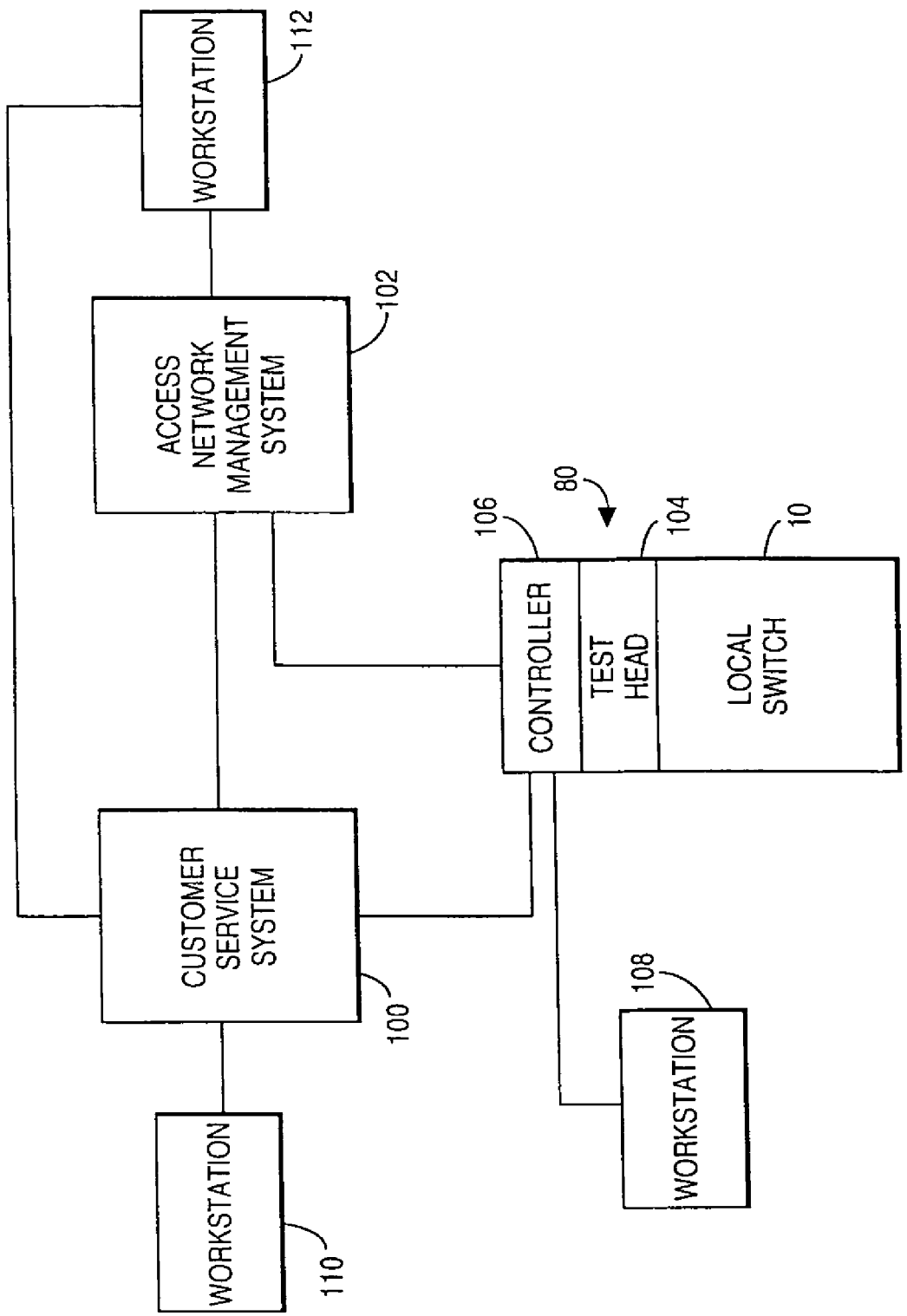
FIG. 2 is a block diagram showing the components of the communications network which are used to provide a fault management system embodying the invention for the access network of FIG. 1.

Referring now to FIG. 2, there is shown the local switch 10 and the components of the communications network which provide a fault management system for the access network 12. These components comprise the line tester 80, a customer service system 100 for the communications network and an access network management system 102. The line tester 80 comprises a test head 104 which contains the electronic equipment for physically making line tests and a controller 106 for the test head 104. The controller 106 takes the form of a computer. The controller 106 can be operated from a workstation 108 connected to it and provided at the local exchange 10. The controller 106 is also connected to both the customer service system 100 and the access network management system 102 and can be operated by workstations connected to either the customer service system 100 or the access network management system 102.

Figure 3:
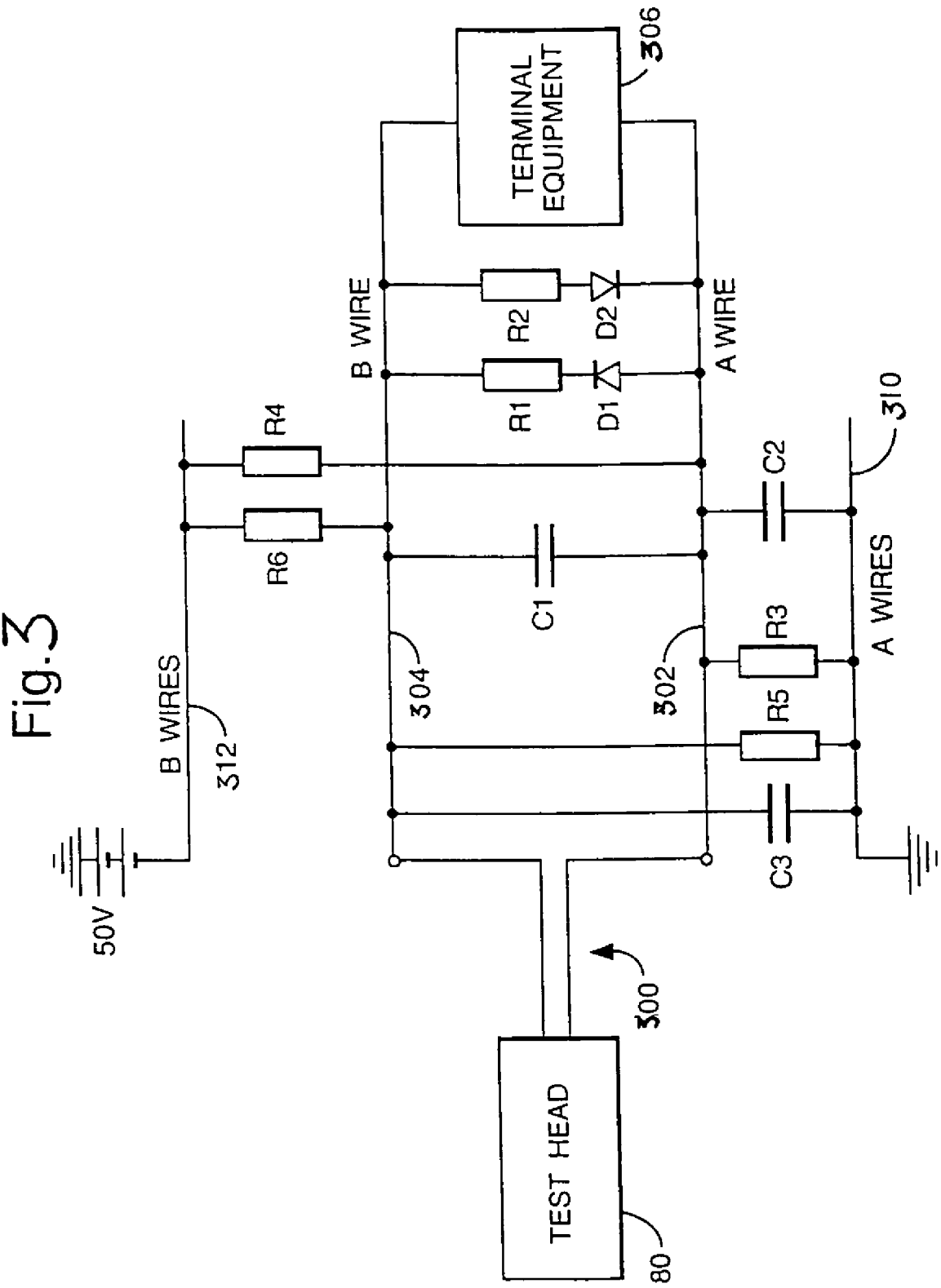
FIG. 3 is a circuit diagram illustrating some of the measurements which are made when testing a terminating circuit.

The customer service system 100 is also a computer and it can be operated from any one of a number of workstations which are connected to it. In FIG. 3, one such workstation is shown and indicated by reference numeral 110. The customer service system 100 is used by operators of the communications network who have contact with the customers of the network. Together with these operators, the customer service system is responsible for providing various services to the customers.

The access network management system 102 is also a computer and it can be operated from one of a number of workstations. One of these workstations is shown in FIG. 3 and indicated by reference numeral 112. The access network management system 102 is responsible for managing the access network 12 as well as a number of other access networks in the same general geographical area as the access network 12. The access network management system manages various operations for each of the access networks which it manages. These operations include the provision of new equipment, logging data on work performed by engineers in the network, maintaining data on the terminating lines and nodes of each access network detection and management of faults. The workstations which are connected to the access network management system 102 are also connected to the customer service system 100. As shown in FIG. 3, the customer service system 100 and the access network management system 102 are connected together.

The operations performed by the customer service system 100 and the access network management system 102 apart from the detection and management of faults in the access network 12 do not form part of the present invention and will not be described in further detail.

Although in the present example the fault management system for the access network 12 is formed from the line tester 80, the customer service system 100 and the access network management system 102, the fault management system could also be provided simply by the line tester 80 on its own. In order to achieve this, it would be necessary to add appropriate software to the computer which forms the controller 106. In a small network, this might be an appropriate form of providing the fault management system. However, in a large network it is advantageous to integrate the fault management system into the customer service system 100 and the access network management system 102.

The controller 106 is programmed to cause the test head 104 to make a series of routine tests each night on each terminating line of the access network 12. These tests will be explained with reference to the circuit diagram shown in FIG. 3.

In order to test a line, it is disconnected from the switch 10 and connected to the test head 104. FIG. 3 shows a line 300 being tested. The line 300 has an A wire 302 and a B wire 304. The end of line 300 remote from switch 10 is connected to terminal equipment 306. Each of the lines 302, 304 has a resistance which depends upon its diameter and the distance from the local switch to the terminal equipment 306. Each of the wires 302, 304 is coated with an insulating material. The function of the insulating material is to provide insulation between each wire and adjacent wires. Damage to the insulating material or oxidation of the metal of a wire can cause the resistance between two adjacent wires to fall.

The effectiveness of the insulation between wires 302, 304 can be determined by measuring the resistance R1 between the A wire 302 and the B wire 304 and the resistance R2 between the B wire 304 and the A wire 302. The resistances R1 and R2 may be different because of rectification as indicated by diodes D1 and D2. For a circuit in good condition, the resistances R1 and R2 are high, greater than 1 megaohm. Damage to the insulating material or oxidation will cause the resistances R1, R2 to fall by an amount which depends upon the severity of the damage or oxidation. If the insulating material is totally destroyed so that the A and B wires are physically touching each other, the values of resistances R1, R2 will depend upon the distance between the test head 80 and the point of damage but will typically lie in the range 0 to 1500 ohms. Oxidation can result in wires effectively touching each other.

Only the A and B wires 302, 304 of the line 300 being tested are disconnected. In the other lines, the bias voltage of 50 volts is applied between the A wire and the B wire. In FIG. 3, the A wires of the other lines are collectively shown by a wire 310 which is connected at the switch 10 to earth. The B wires of the other lines are collectively shown by a wire 312 connected at the switch to a potential of −50 volts.

If the insulating material separating the A wire 302 or the B wire 304 from one of the adjacent A or B wires becomes damaged, or if one of the wires suffers oxidation, current may flow. The effectiveness of the insulation between the A and B wires 302, 304 and adjacent A and B wires can be determined by measuring the resistance R3 between A wire 302 and adjacent A wires 310, the resistance R4 between the A wire 302 and adjacent B wires 312, the resistance R5 between the B wire 304 and adjacent A wires 310, and the resistance R6 between the B wires 304 and adjacent B wires 312.

For a good circuit, the resistance R3, R4, R5, R6 are high, greater than 1 megohm. Damage to insulating material may cause one or more of the resistances R3, R4, R5, R6 to fall by an amount which depends upon the severity of the damage. If the insulating material between the A wire 302 or the B wire 304 and an adjacent wire is totally destroyed so that the two wires are physically touching each other, the resistance between the two touching wires will depend upon the distance between the test head 80 and the point of damage but will typically lie in the range 0 to 1500 ohms. Oxidation can also result in two wires effectively touching each other.

The A and B wires 302, 304 and the insulating material between them act as a capacitor. In FIG. 3, the capacitance between the A and B wires is shown as having a value C1. The value of the capacitance between the A and B wires of a line will depend upon the length of the line. A break in the line 300 will reduce the value of capacitance C1 as measured from the test head 80. FIG. 3 also shows the capacitance C2 between the A wire 302 and earth and the capacitance C3 between the B wire 304 and earth.

Each night, the controller 106 causes the test head 80 to measure the resistances R1, R2, R3, R4, R5, R6 and the capacitances C1, C2, C3 for each terminating line of the access network 12. The controller 106 also causes the test head 80 to check if there is terminal equipment connected to the end of the line. Terminal equipment has a standard capacitance value. When terminal equipment is connected, the value of its capacitance is subtracted from the capacitance as measured by the test head to obtain the capacitance C1. For each terminating line, the results of the tests are stored against its directory number in the access network management system 102.

The controller 106 transmits the results of the tests to the access network management system 102. The access network management system 102 examines the results of the series of tests for each terminating line for the presence of a suspected fault. The possible faults include disconnection, short circuit, a fault battery voltage, an earth fault and low insulation resistance. When a fault is suspected, the name of the fault and the results of the test for the line are stored in the access network management system 102 against its directory number or an identifier in the exchange associated with the line. The details of the suspected faults found each night may be reviewed by an operator of the access network management system 102. Where appropriate, the operator may give instructions for a fault to be repaired.

The network management system 102 is also arranged to carry out some further processing of the data collected from the over-night testing. This further processing is designed to test potential faults rather than actual faults so that, where appropriate, remedial work can be carried out before the fault is detected by a customer. These tests use the resistance and capacitance measurements noted above to provide an indication of the probability of a given line becoming faulty within a given time period. The tests also give an indication of whether the fault is likely to be in the part of the network that is underground or the part of the network that is overhead. Whether a fault is underground or overhead has a significant effect on the cost of repair of the fault and therefore is an important factor in assessing which of a number of potential faults should be tackled first.

An overview of the processing carried out by the network management system 102 will now be given with respect to FIG. 4 and a detailed example of the processing will also be given below. The processing is initiated at step 401 either automatically in response to the receipt of the appropriate data or by a human operator and processing moves to step 403. At step 403, using known methods (which will be described in detail below), the test data for all the lines in question is analysed to identify existing faults. These are termed "hard faults" and are divided in to two categories namely disconnection faults and rectified loop faults and have identifiable electrical characteristics that allow them to be recognised as such as noted above.

Once these hard faults have been identified the processing moves to step 405 at which point the remaining test data is analysed further. This analysis involves further inspection of the test data to identify lines with characteristics that indicate that a hard fault is likely to occur within a predetermined period of time. The parameters for determining this are derived from historical data.

At step 407, the data for the lines that have been identified as having anticipated hard faults are analysed further to assess the probability of the fault occurring within a specified period (which in the present embodiment is a year). As in step 405 above, this analysis is carried out for each line on the basis of historical data and results in a score being attributed to each line being tested. Then at step 409 the data is further analysed to give an indication of the probability of the fault being in the overhead (OH) or in the underground (UG) part of the network, giving a score or probability for the fault occurring in each of those areas. Then at step 411 the UG and OH scores are combined to provide a joint score that is used to judge whether the anticipated fault is most likely to be UG or OH.

Finally, at step 413, the scores for each line running though a network element such as a DP or cable node are added together to give a score for the element i.e. to give a probability of a hard fault occurring at the element within the next year. The network element can then be scored on the basis of it UG scores, its OH scores and/or its combined score. A group of network elements, for example those within a given geographical area, can then be ranked to determine those elements most in need of preventative maintenance.

The invention will now be described further by way of a worked example showing test data from a set of lines running though a common DP being processed in the manner outlined above with reference to FIG. 4. FIG. 5 shows the test data for each of nine lines that run through the DP. For each line the test data comprises four capacitance measurements between the A wire and earth, between the A wire and the B wire (both a current measurement and a prior measurement) and between the B wire and earth. The data also comprises a distance measurement for each line and a series of resistance measurements between each combination of the A wire, B wire, Battery and Earth. These correspond to the capacitances C1, C2, C3 and resistances R1, R2, R3, R4, R5, R6 described above with reference to FIG. 3. In addition, there is a previous capacitance reading between the A and B wires and a termination flag (Term) supplied by the Vanderhoff and/or Terradyne equipment.

As noted above, the first step in the processing is the identification of hard faults. This is carried out by analysing the test data for each line in turn and establishing whether the test data falls within a set of parameters as set out in FIG. 6 below. For each of the elements of test data in FIG. 5, FIG. 6 defines a threshold which if the element exceeds it, may indicate the presence of a disconnection hard fault for that line. Each element of test data for a line from FIG. 5 is compared, in accordance with a rule against the parameters of FIG. 6. The rule is as follows:

IF resistance A to Earth>=VD3
AND resistance B to Earth>=VD4
AND resistance A to Battery>=VD5
AND resistance B to Battery>=VD6
AND resistance A to B>=VD7
AND resistance A to B>=VD8
AND (((A-B Capacitance drop>VD1 from previous value) AND (A-B Capacitance<VD2))
OR (Capacitance Balance>VD9)
OR (MIN(Capacitance A—Earth, Capacitance B—Earth)<VD10))
AND ((termination statement to "No termination")
OR (from Vanderhoff "Bell Loop")
OR (from Vanderhoff "Master Jack-loop")
OR (from Teradyne "Bridged"))
THEN the circuit has a HARD FAULT.

Taking the data for line 1 shown in FIG. 5 above and using the parameters from FIG. 6 above it can be seen that all of the resistance measurements exceed the parameters (i.e. all the resistance measurements of 700,000 Ohms exceed the threshold of 1 Mega Ohm), that two of the three capacitance measurements fall within the given range and the Teradyne "bridged" flag is satisfied. As a result, each clause of the rule is satisfied indicating the presence of a disconnection hard fault on line 1.

The next step in the processing noted above is the analysis of the test data to identify any rectified loop hard faults. FIG. 7 shows the parameters for the test data that are used in identifying rectified loop hard faults, again using a rule to apply the parameters to the data. The rule for rectified loop detection is as follows:

Where the B leg to A leg MIN=MIN (B leg to A leg resistance, A leg to B leg resistance) AND
the B leg to A leg MAX=MAX (B leg to A leg resistance, A leg to B leg resistance)
Then IF B-leg to A-leg MIN<=TR1 Ohms
AND B-Leg to A-Leg MIN>TR2
AND B-Leg to A-Leg MIN is NOT between TR4 and TR3
AND B-Leg to A-Leg MAX>TR5×B-Leg to A-Leg MIN
AND (resistance A to Battery<=TR7
OR resistance B to Battery<=TR8
OR resistance B to Earth<=TR9
OR resistance B to Earth<=TR10)
THEN the circuit has a Rectified Loop Hard Fault.

For each of the elements of test data in FIG. 5, FIG. 7 defines a threshold which if the element exceeds it, may indicate the presence of a rectified loop hard fault for that line. Each element of test data for a line from FIG. 5 is compared, in accordance with a formula (set out below) against the parameters of FIG. 7. Taking the data for line 2 from FIG. 5 above and applying the rules it will be seen that each clause of the rule is satisfied i.e. the B to A leg minimum resistance is between 10 and 30 k Ohms and not in the range of 700 to 5000 Ohms, the B to A leg maximum resistance is not more that twice the B to A leg minimum and at least one of the A or B resistances to earth or battery are less that or equal to 400 k Ohms. Accordingly, line 2 is considered to have a rectified loop hard fault.

Once the test data for all the lines has been analysed to identify the hard faults, the processing of the test data moves on to the next stage as noted above where the data is analysed further. The purpose of this further analysis is to identify those lines which, although they have not yet developed a hard fault, have characteristics that suggest they are likely to become faulty within a specified period. Again the data is analysed in accordance with a rule against a set of thresholds as set out in FIG. 8.

The rule for identifying anticipated hard faults checks each element of the test data in turn and establishes whether or not it falls within the two thresholds for each element defined in FIG. 8. The number of elements that fall within the thresholds is counted and if this exceeds a further threshold the line is considered to have an anticipated hard fault. The rule is as follows:

FOR N=AHF 1 to AHF 19
IF Threshold1 (N)<Test-Read (N)<Threshold2 (N)
THEN Anticipated Hard Faults=Anticipated Hard Faults+1 (Count)
END IF AHF 2<=Anticipated Hard Faults
THEN the circuit has an Anticipated Hard Fault.

In addition to the resistance and capacitance measurements the test equipment can is also arranged to produce a set of voltage measurements. The comprise six DC voltage measurements between line A and a negative/positive earth, line B and a negative/positive earth and between line A and line B when line B is negative and when it is positive. The voltage measurements also comprise three AC voltage measurements between line A and line B and between each line and earth. These voltage measurements can be used in the processing to identify anticipated hard faults and the detailed example will be described on this basis. However, the use of the voltage measurements is optional and the processing can be carried out without them. The voltage measurements for line 2 in the current example are shown in the "Actual" column of the table of FIG. 8. The voltage measurements for the other lines are not shown.

Taking the test data for line 2 from FIG. 5, it can be seen that the A to B and B to A resistance measurements are both within the limits specified as are the voltage measurements AHF 8, 9 and 12. As a result, five parameters contribute towards and overall score that exceeds the threshold parameter resulting in line 2 being considered to have an anticipated hard fault.

Now that line 2 has been designated as an anticipated hard fault i.e. is expected to show a hard fault within the specified time period of one year, the next stage in the processing is to determine the probability of that event occurring. In other words, the probability of the deterioration of the electrical characteristics of the line continuing into a range where the quality of the line is likely to be affected. Again, the processing uses a set of parameters as set out in FIG. 9 in combination with a pair of rules which are as follows:

Then the Probability of Failure for electrical characteristics are as follows
FOR n=PB1 to PB19
A—IF Lower Limit (n)<Upper Limit (n)
AND Upper Limit (n)>Test Read (n)=>Lower Limit (n)
THEN $$\text{Prob. of Failure}(n) = \text{Minimum}\left(1, \frac{(\text{Upper. Limit}(n) - \text{Test. Read. }(n))}{(\text{Upper. Limit}(n) - \text{Lower. Limit }(n))}\right)$$

ELSE Probability of Failure (n)=0.0
B—IF Lower Limit.(n)>Upper Limit.(n)
AND Upper Limit (n)<=Test Read (n)<Lower Limit (n)
THEN $$\text{Prob. of Failure. }(n) = \\ \text{Minimum}\left(1, \frac{(\text{Test. Read.}(n) - \text{Upper. Limit }(n))}{(\text{Lower. Limit}(n) - \text{Upper. Limit }(n))}\right)$$

ELSE Probability of Failure (n)=0.0
IF none of the above satisfied default the probability of Failure=0.0

The parameters in FIG. 9 comprise, for each element of the test data, a set of limits which the above rule uses to establish whether the particular element of test data is within the range where a hard fault will occur within a year. If the element is outside this range then the probability of failure assigned to it is zero. If the element falls within the range this indicates that there is a probability of a hard fault occurring within a year. In this case the above rule which is based on the relative differences between the element of test data and the upper and lower limits for that element as defined in FIG. 9. In other words, since the upper limit is the level at which a hard fault is likely in the a years time and the lower limit is the level at which a hard fault is imminent then the probability is determined by how close the element of test data is to the lower limit relative to the upper limit.

The two rules above, rule A and Rule B, are used to carry out the same calculation but rule A is designed for use when the parameter range is positive while rule B is designed for use when the parameter range is negative. Which rule should be used when is indicated in the "Type" column of FIG. 9 as either type A or type B.

Taking the first element of the test data for line 2—PB1, the resistance measurement of 22700 Ohms falls within the upper and lower threshold values and results in a probability of 0.98. Similarly, PB6—a resistance measurement of 351, 656 Ohms will result in a probability of 0.64.

Once the probabilities have been calculated for each element of the test data then the next stage in the processing modifies each probability depending on whether the element would be expected to demonstrate a fault in the over-ground or underground part of the network. This is possible since certain electrical characteristics can be correlated with particular types of degradation of the cables which are attributable to the particular physical environment of the cable. The modification process is carried out by multiplying each probability by a weighting for underground (UG) and by a weighting for over-ground (OG) resulting in two revised probabilities for each data element. All of the UG probabilities are then added together and all of the OH probabilities are added together to give an OH score for the line and an UG score for the line. The formulae for calculating these scores are as follows:

$$OH \text{ Score} = \sum_{For\ all\ tests(PB1\ to\ PB19)} (\text{Probability of failure.}(n) \times OH.\text{ weighting }(n))$$

$$UG \text{ Score} = \sum_{For\ all\ tests(PB1\ to\ PB19)} (\text{Probability of failure.}(n) \times UG.\text{ weighting }(n))$$

FIG. 10 shows these calculations for the test data from line 2 which provide a UG score of 38.85 and a OH score of 49.39. These scores result from the application of the UG and OH weighting factors to the probabilities for each element of test data added together in accordance with the rule above. From FIG. 10 it can be seen that for the resistance measurements one of the weighting factors is zero. This means that the element concerned gives no significant indication of a fault for that category (OH or UG) of fault and so its probability is weighted to zero. The level of weighting applied is dependent on empirical evidence i.e. on data of actual faults that have occurred.

The next stage in the processing determines, from the total UG and OH scores for the line, a combined score which is compared to a threshold value to give an indication of the most likely location for the anticipated hard fault i.e. whether the fault will be in the OH network or the UG network. The following rule is used to combine the OH and UG scores for a line.

$$\text{ANGLE} = \frac{ANG1 \times OH.\text{ Score}}{\sqrt{(ANG1 \times (OH.\text{Score})^2) + (ANG2 \times (UG.\text{Score})^2)}}$$

Then the following rule is used to compare the "angle" of the combined OH and UG score against a threshold angle. If the combined score angle is greater than the threshold then the anticipated fault is expected to be Overhead and if it is less than the threshold angle then the fault is expected to be Underground. The rule for determining this is set out below.

If ANGLE>=Sine(ANG3)
THEN anticipated fault is located in the OVERHEAD NETWORK
If ANGLE <Sine(ANG3)
THEN anticipated fault is located in the UNDERGROUND NETWORK (ANG1, ANG2 and ANG3 are variables with ANG1 and ANG2 being set in this example to the integer 1 and ANG3 to 45 degrees. These variable can be used to trim the performance of the above algorithm.)

Continuing the example from above, the OH score of 38.85 and the UG score of 49.39 are combined in accordance with the formula above to gives a combined score of 62.86. This is then used to calculate the Angle—which is 0.7867 i.e. greater than Sine (45)=0.7071, indicating that the anticipated fault is expected to occur in the overhead network.

The processing of the test data continues until all the lines under investigation have been processed in the manner described above and either identified as hard faults, anticipated hard faults or as clear of faults. The lines that have anticipated hard faults can be ranked or ordered in terms of their overhead score, underground score or combined score. This then enables the proactive repair of the anticipated hard faults to be prioritised by those most likely to become hard faults soonest but also by the location of the fault. The location of a fault is important knowledge to have in scheduling repair since the skills of the repairers and the cost of the repair are normally very different for a underground and overhead faults.

As noted above, the lines in the network run through interconnection points such as DPs or cable nodes. Commonly, it is at these points where faults occur since these are the places where the cables is physically joined to each other and therefore the most likely place for connections or insulations to break down and cause faults. Therefore, if the test data for all the lines running through a given DP or other network element is processed as described above it can then be combined to give a score for the network element. The UG, OH and combined scores for each line running through the network element are added together to give a score for the element as a whole.

Having scores for the elements themselves give further advantages when carrying out or planning proactive network maintenance. For example all DPs can be ranked by their OH score or their UG score which enables the proper identification of the required skill set of the engineers who will repair a given fault. Furthermore, scores (UG, OH and Combined) can be used in deciding which of a number of elements with hard faults should be repaired first. For example, two DPs each having two hard faults but one also having a much higher UG, OH or combined score thereby enabling the DP most likely to show further hard faults in the near future to be repaired more urgently.

The network management system 102 can be further arranged to process the data collected from the overnight testing to provide results that give an indication of the likely future costs of repair to the network over a predefined period of time. This processing takes in to account both the hard faults that have been recognised as well as the anticipated hard faults. An overview of this processing will now be given with reference to FIG. 11 and a more detailed example will also be given below. The processing is initiated at step 1101 either automatically in response to the receipt of the appropriate data or by a human operator and the processing moves to step 1103. At step 1103, hard faults are identified and categorised (as disconnections or rectified loops) in the same manner as described above with reference to step 403 of FIG. 4 and the anticipated hard faults are identified in the same manner as step 405. Also, the probability of failure for each parameter of the test data is calculated in accordance with the steps described above with reference to step 407 of FIG. 4.

At step 1105, each probability is weighted depending on its importance in calculating the final score for the line that it relates to and then the probabilities for each element (as weighted) are added together with some further factors to give a score for the line as a whole know as the AFS score. This score is weighted further depending on whether or not the line has also been identified as having a hard fault and/or an anticipated fault in step 1103. Steps 1103 and 1105 are carried out for each line for which test data has been collected. In the next step 1107 if data for one or more of the lines is missing a smoothing algorithm is applied which has the effect of compensating for the missing data so that the results of the processing are not skewed.

Figure 4:
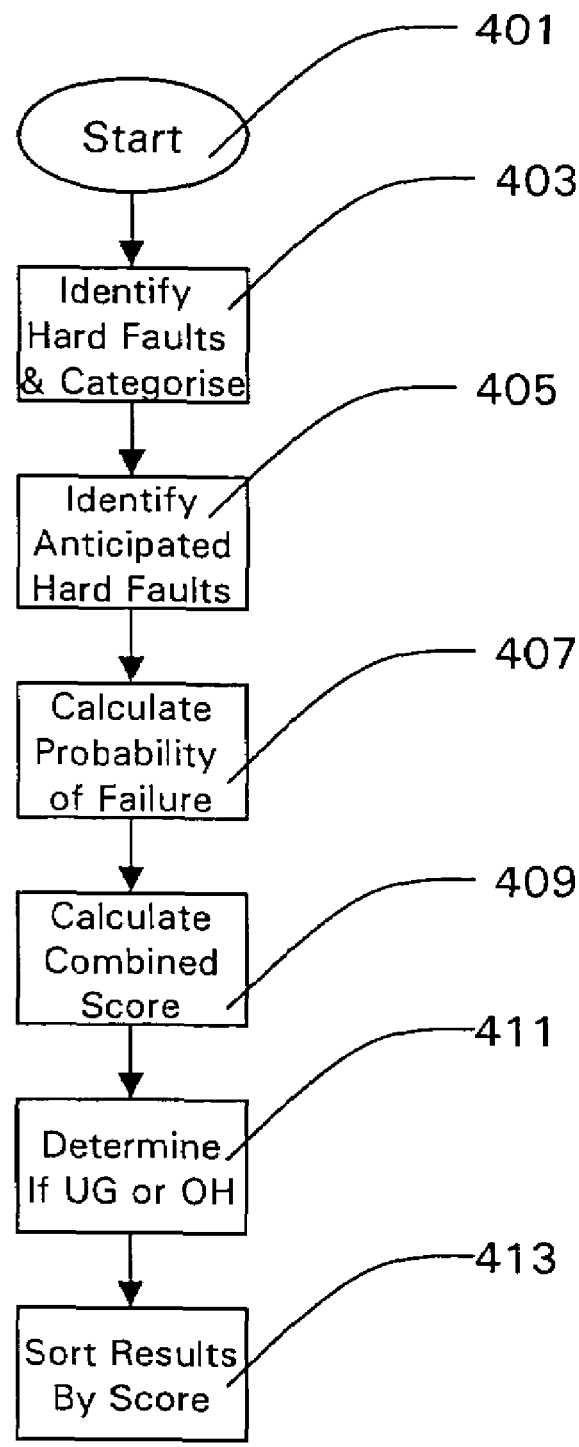
FIG. 4 is a flow diagram illustrating the processing performed in the fault management system in identifying faults in the network.

Next, at step 1109, the UG, OH and combined probabilities are calculated for each line of the network element for which there is data present in the same manner as steps 409 and 411 of FIG. 4 above. A determination of whether the anticipated fault is UG or OH is also calculated as in step 411 above. Next, in step 1113, the accumulated data is combined in accordance with three separate formulae to give and overall score for the DP. These three formulae take in to account the relative costs of repairing particular types of faults and as a result, the AFS scores can be used to estimate or predict the costs of maintaining the network elements for the predetermined period. At step 1115, the UG, OH and combined scores are used to rank the current DP against the equivalent scores for other DPs and network elements. The ranking of the network elements by relative cost assists the network administrator when budgeting since the costs of repairs over the coming year can be estimated. The ranked data also highlights points in the network where the preventative maintenance effort should be directed.

Figure 11:
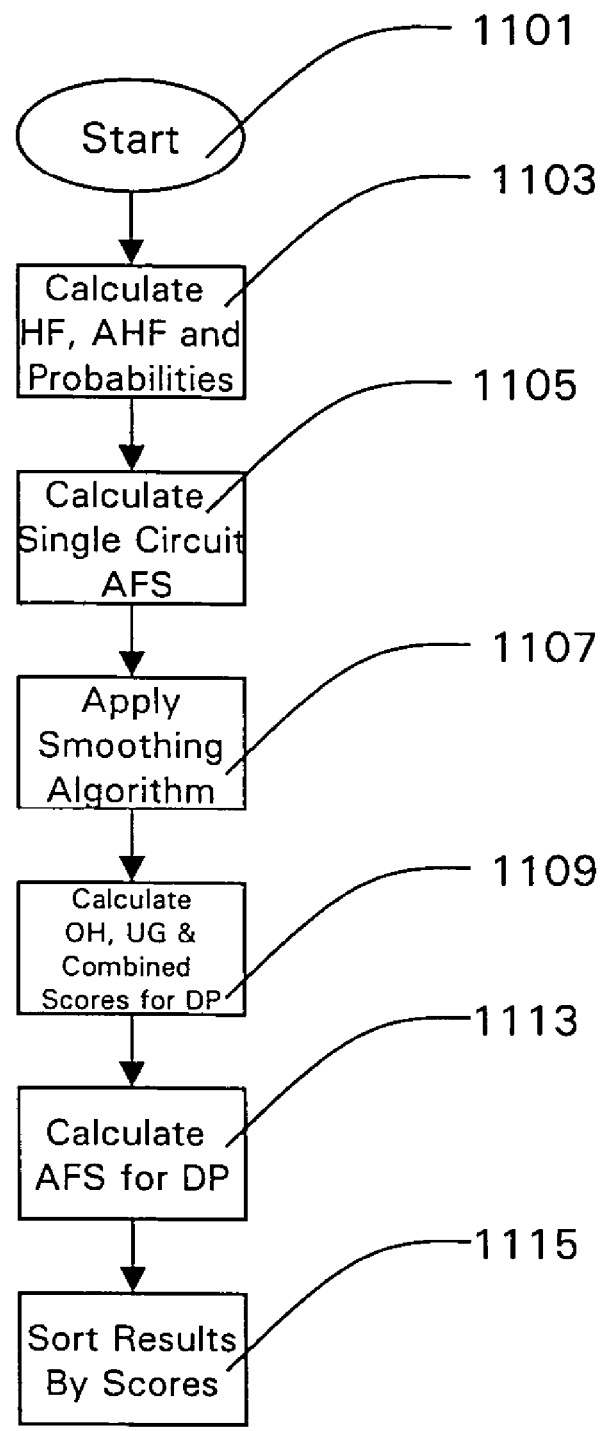
FIG. 11 is a flow chart of the steps which are performed in the fault management system to obtain reference data on faults in the network.

The invention will now be described by way of a worked example showing the test data from a set of lines running through a DP being processed in the manner outlined above with reference to FIG. 11. The same test data example from FIG. 5 will be used as was used to describe the processing in relation to FIG. 4. The first step in the processing is to identify the hard faults, anticipated hard faults and their probabilities in the same manner as was described above with reference to steps 403, 405 and 407 of FIG. 4. Then, as set out in FIG. 12, the probabilities are multiplied by a weighting factor which effectively selects the resistance measurements AFS1-6 for subsequent processing. The resulting probabilities are then summed in accordance with the formula below:

$$AFS.\ Score = \left\{ \begin{array}{l} \sum_{\text{For all tests}(AFS1\ to\ AFS19)} \text{Probability of failure}(n) \times AFS.\ \text{Weighting}(n) + \\ AFS20(\text{IF Hard Fault Circuit}) + \\ AFS21(\text{IF Anticipated Hard Fault Circuit}) \end{array} \right\}$$

As can be seen from the above formula, that in addition to the summed probabilities for each element of the data, two further weightings are added. The first weighting is added if the line was identified in step 1103 as having a hard fault and the second is added if in step 1103 the line was also identified as an anticipated hard fault. The AFS score is then compared to a table of values shown in FIG. 13 to give an AFS value which corresponds to the number of faults that would be avoided on that line if it were to be repaired immediately. The AFS score is calculated for each of the lines under investigation. Taking the example of line 2, from FIG. 12 it can be seen that the sum of the weighted probabilities is 4.51 which is then has a hard fault weight of 5 and an anticipated fault weight of 3 added to it giving a total of 12.51. This AFS score is compared to the table of FIG. 13 in accordance with the following rule and in results in the actual AFS value of 1.

For n=SC1 to SC12 (see the table of FIG. 13)
   IF Lower lnterval.(n)<=AFS Score<Upper Interval.(n)
      THEN Actual AFS=Circuit AFS.
      ELSE AFS=0.

When the AFS score has been calculated for each line under investigation, the next stage in the processing is the application of a smoothing algorithm to compensate for situations where test data can not be obtained for one or more of the lines. In the current example using the data from FIG. 5, all the data for the DP is present. If however, data for lines 3 and 7 were missing then the smoothing algorithm would be applied. The smoothing algorithm is designed so that AFS scores for DPs where data is missing can be meaningfully compared with those of other DPs. The smoothing algorithm is as follows:

$$SMV.\ DP = \text{Min} \left\{ 1 + SMV1, \frac{\text{(No. of unique circuits } DN/\text{Line}}{\text{(No. unique } DN/\text{Line}} \frac{\text{No combinations that make up a } DP)}{\text{No. combinations that were tested on a } DP)} \right\}$$

The above rule takes the minimum value from either the smoothing parameter plus 1 or the ratio of total lines under investigation and those for which test data has actually been obtained. The smoothing parameter is set as 0.6 and is provided so that the upper limit of the smoothing parameter can be adjusted. Continuing with the example, if test data for only seven out of nine possible lines is available then the smoothing factor will be calculated as the minimum of 1.6 (1=0.6) and 1.28 (7/9) which is 1.28. This smoothing factor would then used in the subsequent calculation for AFS scores for network elements e.g. DPs or cable nodes.

FIG. 14 shows the results of the processing of the data of FIG. 5 in accordance with the steps described so far. From the inspection of these results it can be seen that lines one and six to nine are clear of faults. Line two as described above has been categorised as both a hard fault and an anticipated hard fault in the overhead network. Line two has also achieved an AFS score of one. Lines three to five all have some characteristics that indicate possible faults but none of them hard faults and none of them significant enough to be considered as an anticipated hard fault. However, the indications are significant enough to be able to show that when such a fault does occur it would be in the underground network. The fact that there is still potential for a fault to occur is also reflected in the AFS scores for each of these lines which show AFS scores of 0.3, 0.3 and 0.4 respectively. In other words, there are no actual faults identified on these lines and they are not expected to become faulty within a year but nevertheless there is still some chance of a fault within that year.

The scores for each line are summarised in the lower half of the table of FIG. 14 which gives the total OH, UG and combination scores for the DP and totals of hard faults and anticipated hard faults for the underground network. In addition there are totals for the number of possible faults and AFS score totals again split between those indicated in the underground network and those indicated in the overhead network.

The next step in the processing is to use the data from the table in FIG. 14 to calculate the scores (UG, OH and combined) for the DP as a whole. This is done in accordance to three formulae. The formula for calculating the overhead score for the DP is shown in FIG. 15. For each line of data that has been designated as being a potential or actual fault in the overhead network the formula adds together the total OH score, the total number of anticipated hard faults, the total number of hard faults and the total number of circuits. From this is subtracted the difference between the total number of circuits in the DP and the number of circuits that are OH. Each of these elements of data are also multiplied by the smoothing factor (which in the present example is one since there is data present for each line running through the DP). Each element is also multiplied by a ranking value as set out in the table in the lower half of FIG. 15. The ranking value is used to modify the effect that any one of the five values that are summed above have on the overall OH score for the DP. The result of these calculations as set out in FIG. 15 is a total OH score for the DP of 181.04.

FIGS. 16 and 17 show the equivalent formulae and ranking parameters for the calculation of the UG score for the DP and for the combined score for the DP. The difference in the UG formulae is the where the OH formula takes the OH scores and the OH circuits the UG formula takes the UG scores and the UG circuits. The combined score formula takes the combined score for all the circuits in the DP, all of the hard, anticipated hard faults and suspect circuits.

The results of the processing in accordance with the three formulae of FIGS. 15 to 17 is a UG score of 181.04, a OH score of 209.10 and a combined score of 261.10 for the DP. As will be understood by those skilled in the art, the formulae set out in FIGS. 15, 16 & 17 can be modified to provide scores for other network elements which may have more lines running though them such as a cable node which may have 100 lines running through it.

The final step in the processing for the data is to calculate the annual fault saving (AFS) score for the DP as a whole (as opposed to a single circuit as described above). The formula which is used for this is set out in FIG. 18. For the UG AFS the AFS for each circuit in the DP is added up which in the example gives a UG AFS for the DP of 1.0 (from lines 3, 4 & 5 i.e. 0.3+0.3+0.4). The OH AFS for the DP is 1.0 also (from line 2's AFS). The combined AFS score comes to 2.0.

The AFS score as described above can be established either for a single line (or circuit) or for a network element such as a DP or cable node. The AFS score combines the probability of a fault occurring within the given time period with the cost of repair of the fault should it occur. Furthermore, the cost of repair takes in to account whether the fault is expected to be in the underground or in the overhead network. The AFS allows the network administrator to rank the test data from the network on a line by line basis or on the basis of network elements. Where the ranking is performed on the basis of network elements the AFS score is calculated such that elements can be meaningfully compared even when data is missing and/or when the elements being compared have different numbers of lines running through them. Since the AFS score has a UG and OH element as well as a combined element, the AFS score can be used to rank the test data either from the perspective of the underground network or the over-ground network (as well as overall). All of these features enable the test data to be more easily analysed and processed by the network administrators and assists in lowering network maintenance costs and increasing efficiency.

The parameters described above with reference to FIGS. 6 to 10, 12, 13 and 15 to 17 are all dependent on characteristics of the network which is being tested and monitored. The parameters can be modified to adjust the processing of the test data so that the results more accurately measure the network performance. Most of the threshold values can be obtained from analysis of historical electrical characteristics in combination with fault histories or logs. These can be used to establish initial values for the threshold which can then be compared to the subsequent performance of the network and adjusted as necessary.

Figure 19:
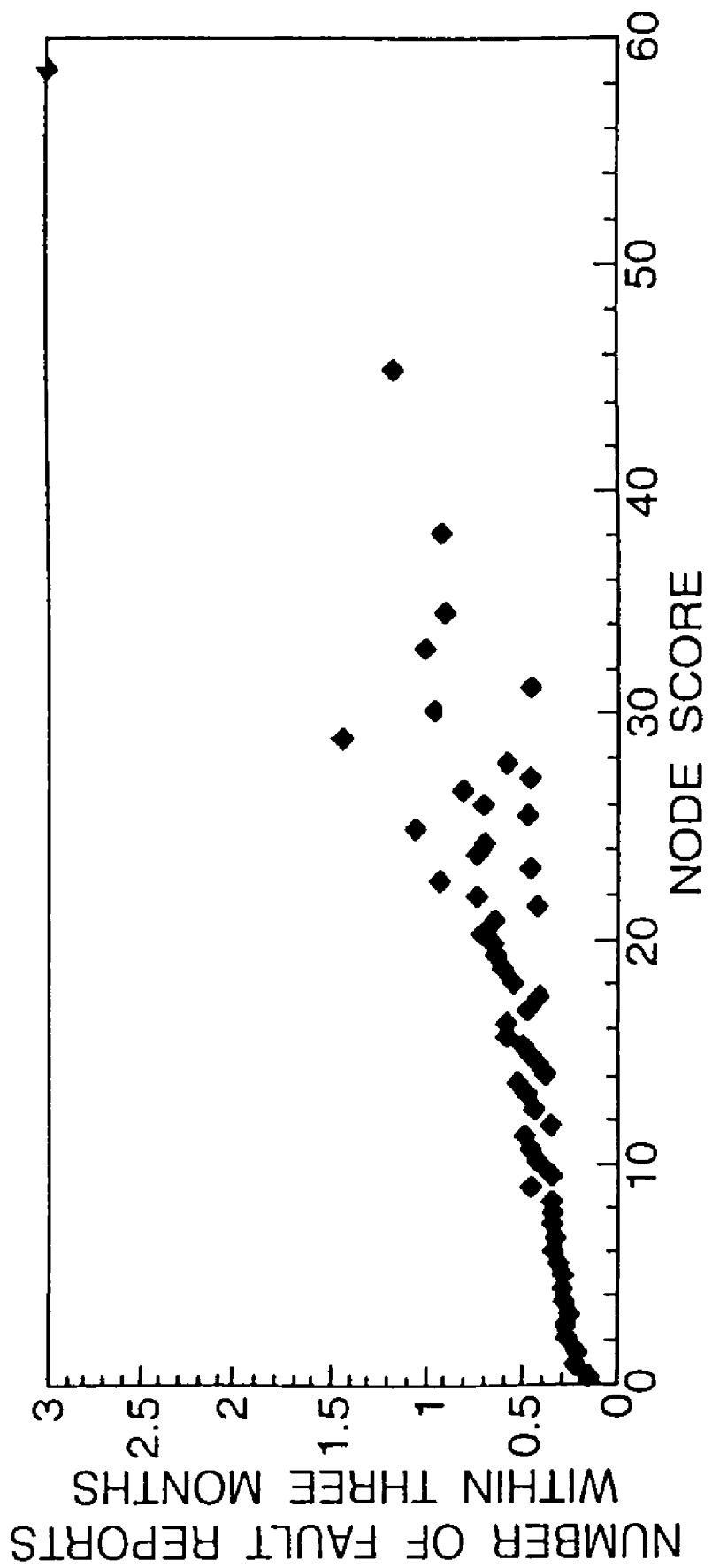
FIG. 19 is a graph showing data from the use of the present invention in a communications system.

FIG. 19 shows the results of some experimental work in the nodes in an access network forming part of a communications network. The node score was evaluated for a large number of nodes. Each node was then monitored for a fault report from a customer during the subsequent 3 months. In FIG. 11, for these nodes, the node score is plotted against fault reports received during the three months after evaluating the node score. These experimental results show a strong correlation believed node score and number of fault reports.

Although the present invention has been described with reference to an access network in which each circuit is carried by a piece of copper wire, it may also be used for terminating circuits carried by optical fibres.

It will be understood by those skilled in the art that the apparatus that embodies the invention could be a general purpose computer having software arranged to provide the analysis and/or processing of the test data. The computer could be a single computer or a group of computers and the software could be a single program or a set of programs. Furthermore, any or all of the software used to implement the invention can be contained on various transmission and/or storage mediums such as a floppy disc, CD-ROM, or magnetic tape so that the program can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A method of operating a fault management system for a communications network, said communications network including a switch and an access network of one or more terminating circuits connecting said switch to terminal equipment provided for users of the communications network, each of said terminating circuits passing through one or more nodes between said switch and its respective terminal equipment, said method comprising:
   performing a circuit test on each circuit of at least a subset of said terminating circuits and producing a test result for each circuit so tested, each test result comprising one or more elements of test data;
   for each circuit, identifying whether a fault exists on the circuit;
   identifying circuits that have a possibility of becoming faulty within a predetermined period;
   associating a repair cost with each fault or potential fault; and
   for each circuit, calculating a measure of the possible cost of repair of the circuit over said predetermined period.

2. A method as in claim 1, further comprising combining the cost measures for each circuit associated with a network element resulting in a cost measure for the network element.

3. A method as in claim 2, in which where data for one or more circuits running through the network element is missing, a smoothing algorithm is applied to compensate for the missing data.

4. A method as in claim 1, in which the measure of cost can be split between an element associated with the fault(s) being in an overhead or in an underground portion of the network.

5. A method as in claim in which the cost measure is calculated for a plurality of circuits or network elements and then used to rank circuits or lines relative to each other.

6. A tangible computer program storage medium containing a computer program or set of computer programs arranged to cause a general purpose computer or group of such computer to carry out the method of claim 1.

7. A fault management apparatus for a communications network including a switch and an access network of terminating circuits connecting said switch to terminal equipment provided for users of the communications network, each of said terminating circuits passing through a series of nodes between said switch and its respective terminal equipment, said fault management apparatus comprising:
   circuit testing apparatus arranged to perform circuit tests on said terminating circuits to produce test results;
   a store containing data relating to said terminating circuits;
   means for identifying in each circuit whether a fault exists on the circuit;
   means for identifying circuits that have a possibility of becoming faulty within a predetermined period;
   means for associating a repair cost with each fault or potential fault; and
   means operable, for each circuit to calculate a measure of the possible cost of repair of the circuit over said predetermined period.

8. Apparatus as in claim 7, further comprising combining the cost measures for each circuit associated with a network element resulting in a cost measure for the network element.

9. Apparatus in claim 8, in which where data for one or more circuits running through the network element is missing, a smoothing algorithm is applied to compensate for the missing data.

10. Apparatus as in any of claims 7, in which the measure of cost can be split between an element associated with the fault(s) being in an overhead or in an underground portion of the network.

11. Apparatus as in claim 7 in which the cost measure is calculated for a plurality of circuits or network elements and then used to rank circuits or lines relative to each other.

12. A tangible computer program storage medium containing a computer program or set of computer programs arranged to cause a general purpose computer or group of such computers to provide the apparatus of claim 7.

* * * * *